Figure 2:
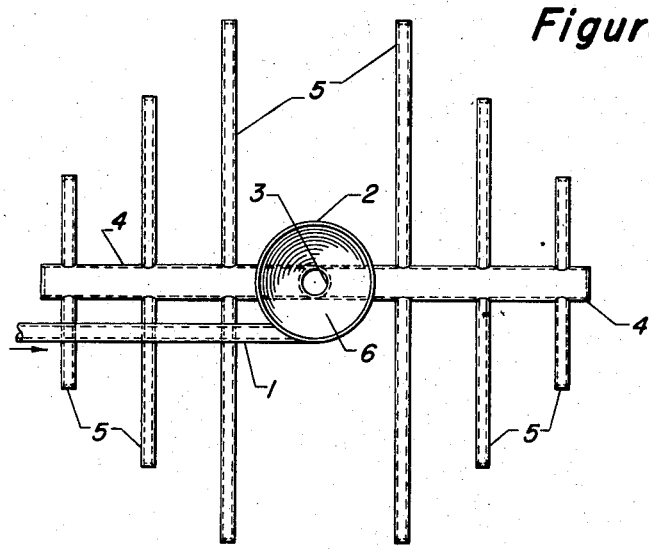

Nov. 18, 1958 L. S. KASSEL 2,860,955
APPARATUS FOR DISTRIBUTING A MIXED PHASE FLUID STREAM
Filed Dec. 15, 1954

INVENTOR:
Louis S. Kassel

By: Chester J. Giuliani
Philip J. Liggett
ATTORNEYS:

United States Patent Office 2,860,955
Patented Nov. 18, 1958

2,860,955

APPARATUS FOR DISTRIBUTING A MIXED PHASE FLUID STREAM

Louis S. Kassel, Oak Park, Ill., assignor to Universal Oil Products Company, Des Plaines, Ill., a corporation of Delaware Application December 15, 1954, Serial No. 475,421

1 Claim. (Cl. 23—288)

This invention relates to apparatus for distributing a mixed phase fluid stream and particularly to a process for evenly distributing a mixed liquid and gas stream into a confined chamber maintained at any pressure.

There are many applications in which it is desirable or necessary to introduce a mixed phase fluid stream into a confined space in a manner requiring even distribution of both phases of the fluid material. Some such applications include introducing a mixed liquid and gas stream onto a bed of catalytic material so that the distribution of liquid and gas is even thereby obtaining maximum effect from the bed of material. This is particularly true when the liquid phase material is to react with the gas phase material and their intimate contact is required. Other uses include introducing mixed feeds into packed fractionation columns, beds of ion exchange material, etc. Although the state of the material may be controlled in many processes, there are some processes wherein the need for introducing a mixed phase fluid feed is inevitable, for example a process for reacting a gas with a liquid in two stages employing two vessels. In this case the liquid and gas phases could not readily be introduced separately into the second vessel.

The present types of liquid distributors used are generally spray heads or piping arrangements in which perforated tubes come off of a main header, and distribute the stream evenly over the area to be covered. In all of these distributors there is a common difficulty when a mixed stream of gas and liquid is distributed. This difficulty is that there is a partial separation of the gas from the liquid so that the liquid stream separates and is distributed through the more centrally located perforations while the gas stream, being lighter is passed to and distributed through the more remotely located perforations. This causes a concentration of liquid in one portion, usually the center, of the bed and a concentration of gas in another portion, usually the circumferential area, thereby causing the inefficient use of the material in the bed and the undesirable effect of having the gas and liquid phases not in intimate contact with each other. It is an object of this invention to provide a means of evenly distributing both the liquid and the gas phase of a mixed stream.

It is an embodiment of this invention to provide a fluid distributing device comprising in combination an inlet conduit, an enlarged open-topped phase separating zone and a liquid distributing means with said inlet conduit connecting to an intermediate section of said phase separating zone and said liquid distributing means connected to the lower section of said phase separating zone.

In another embodiment of this invention the inlet conduit connects tangentially to an intermediate portion of said phase separating zone.

Figure 1:
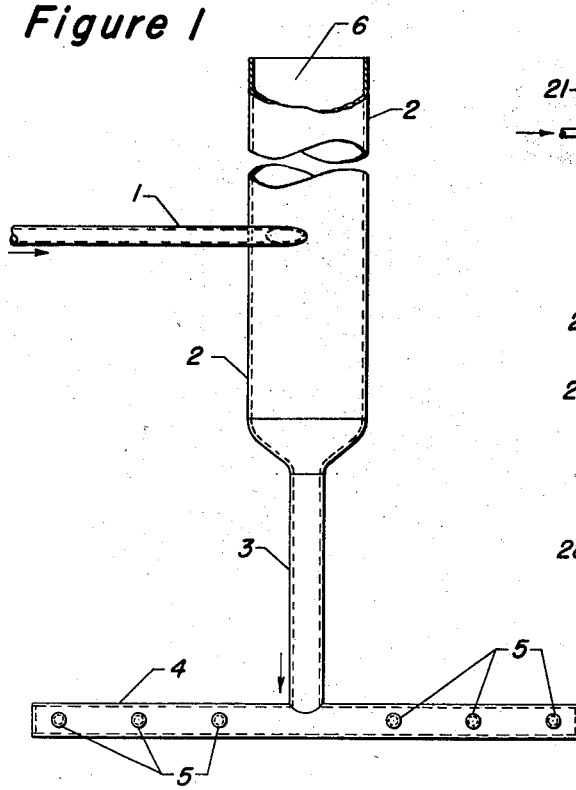
Figure 3:
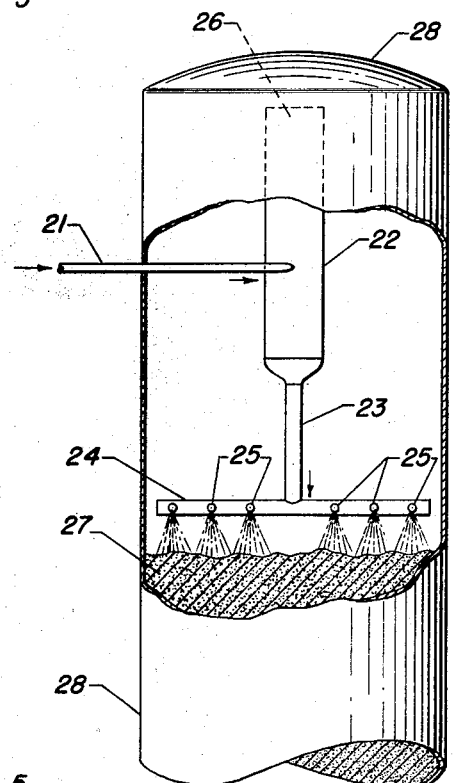

The object and apparatus of this invention may be best explained with reference to the accompanying drawings. Figures 1 and 2, respectively, are an elevation and a plan view of one embodiment of this invention and Figure 3 is a partial sectional view of this embodiment installed in the upper portion of a vessel above a packed bed. It is intended that the drawings are for the purpose of illustrating and not limiting the invention to the particular apparatus herein shown and that all equivalent structures will come within its broad scope.

Referring to Figure 1, fluid introduction conduit 1 enters phase separating zone 2 tangentially and at an intermediate section so that the mixed liquid and gas stream will have imparted thereto a swirling action as well as an overall velocity reduction. The velocity reduction and swirling action will cause a separation of the liquid phase from the gas phase, the liquid phase discharging from phase separating zone 2 into conduit 3 while the gas phase is passed through open top 4 of phase separating zone 2.

The liquid phase passing through conduit 3 enters header 4 and is distributed through distribution conduits 5 branching off from the main header while the gas phase passes from the upper portion 6 of separating zone 2, reverses its direction of flow and passes downwardly on the outside of the apparatus evenly distributed by pressure equalization.

It may be seen that when header 4 is sufficiently large in diameter as compared with the diameter of distributing conduits 5, the head loss due to flow through header 4 will be negligible and the rate of flow of the liquid phase through the perforations in conduits 5 will be controlled by the head of liquid maintained in conduit 3 or separating zone 2. Therefore, all perforations have the same driving force for liquid flow and the liquid is evenly distributed, for example, over the surface of a packed bed maintained below the apparatus. The gas which was separated from the liquid in separation zone 2 reverses its direction of flow, flows downwardly and is evenly recombined with the liquid in the packed bed. It may readily be seen that conduit 3 may be eliminated and that separating zone 2 may be extended to connect directly to header 4. It may also be readily seen that the particular shape of separating zone 2 may be conical or expanded at the top or otherwise altered to provide for suitable phase separation. Sufficient space may be provided above the inlet of conduit 1 so that entrainment of liquid particles will be minimized, however, a fine spray of liquid entrainment is not harmful inasmuch as the entrained liquid carried with the gas stream will be evenly distributed as is the gas stream. When phase separating zone 2 is sufficiently larger in diameter than conduit 1 it may be unnecessary to provide for tangential introduction of the mixed phase feed into the separating zone since sufficient separation may be effected merely by velocity reduction.

Referring to Figure 2 which, as hereinbefore stated, is a plan view of Figure 1, it may be seen that inlet conduit 1 enters enlarged phase separating zone 2 causing a separation of the liquid and gas phases whereby the liquid phase passes through conduit 3 into header 4 and through the branched perforated conduits 5 passing from header 4. The hereinbefore described separation and recombination of the phases needs no further description over that of Figure 1 and Figure 2 is presented here merely to illustrate more clearly the shape and relationship of the various conduits and zones.

Figure 3 illustrates the apparatus of this invention installed in a pressure vessel as it would be in actual operation. It may be seen from Figure 3 that inlet conduit 21 passes through the wall of vessel 28 and tangentially enters enlarged phase separating zone 22 wherein the liquid phase is separated from the gas phase. The liquid phase passes downwardly through conduit 23 and is distributed through header 24 into perforated pipes 25 from which it falls upon the surface of packed bed 27 which may in this embodiment be a catalyst bed. The gas phase from the mixed feed passes upwardly through the phase separating zone and discharges through open end 26 after which it reverses its direction of flow passing downwardly past the exterior portion of the apparatus of this invention and recombines with the liquid material passing through the perforations in conduits 25.

It may be seen from the drawings and the accompanying description that the apparatus of this invention provides a means of evenly distributing mixed phase feeds. This apparatus may be installed in any vessel since it could be used to distribute a total liquid or total gas phase feed even though it is particularly adapted for use with a mixed feed. For maximum effect the distance between the inlet conduit 21 and the open top 26 should be as great as possible and opening 26 should be far enough from the top of vessel 28 to permit the gas phase to readily pass from separating zone 22 to the interior of vessel 28.

I claim as my invention:

A contacting apparatus comprising an enlarged closed vessel containing a bed of solid material in the lower portion thereof, a smaller phase separating chamber in the upper portion of said vessel above said bed, a mixed gas and liquid phase inlet connected to said chamber at an intermediate point in the height thereof, said chamber being open at its upper end and in vapor communication with said bed through the interior upper portion of said vessel around the separating chamber, and a plurality of horizontally disposed, perforated liquid distributing conduits connected to the lower end of said separating chamber and positioned over the surface of said bed.

References Cited in the file of this patent

UNITED STATES PATENTS

| | | |
|---|---|---|
| 1,583,176 | Quisgaard | May 4, 1926 |
| 1,758,983 | Seymour | May 20, 1930 |
| 1,954,352 | Dornbrook et al. | Apr. 10, 1934 |
| 2,067,710 | Jacobsen | Jan. 12, 1937 |
| 2,083,445 | Hellborg | June 8, 1937 |
| 2,535,140 | Kassel | Dec. 26, 1950 |
| 2,586,620 | De Hart | Feb. 19, 1952 |
| 2,683,109 | Norris | July 6, 1954 |
| 2,758,875 | Loveless | Aug. 14, 1956 |

OTHER REFERENCES

Ser. No. 367,293, Van Tongeren (A. P. C.), published May 18, 1943.